Feb. 19, 1963 C. G. DUENKE 3,078,053
ELECTRICAL CORE LOOP WINDING APPARATUS
Original Filed Feb. 28, 1957 12 Sheets-Sheet 1

Clarence G. Duenke,
Inventor.
Koenig and Pope,
Attorneys.

Feb. 19, 1963 C. G. DUENKE 3,078,053
ELECTRICAL CORE LOOP WINDING APPARATUS
Original Filed Feb. 28, 1957 12 Sheets-Sheet 2

Clarence G. Duenke,
Inventor.
Koenig and Pope.
Attorneys.

Feb. 19, 1963   C. G. DUENKE   3,078,053
ELECTRICAL CORE LOOP WINDING APPARATUS
Original Filed Feb. 28, 1957   12 Sheets-Sheet 3
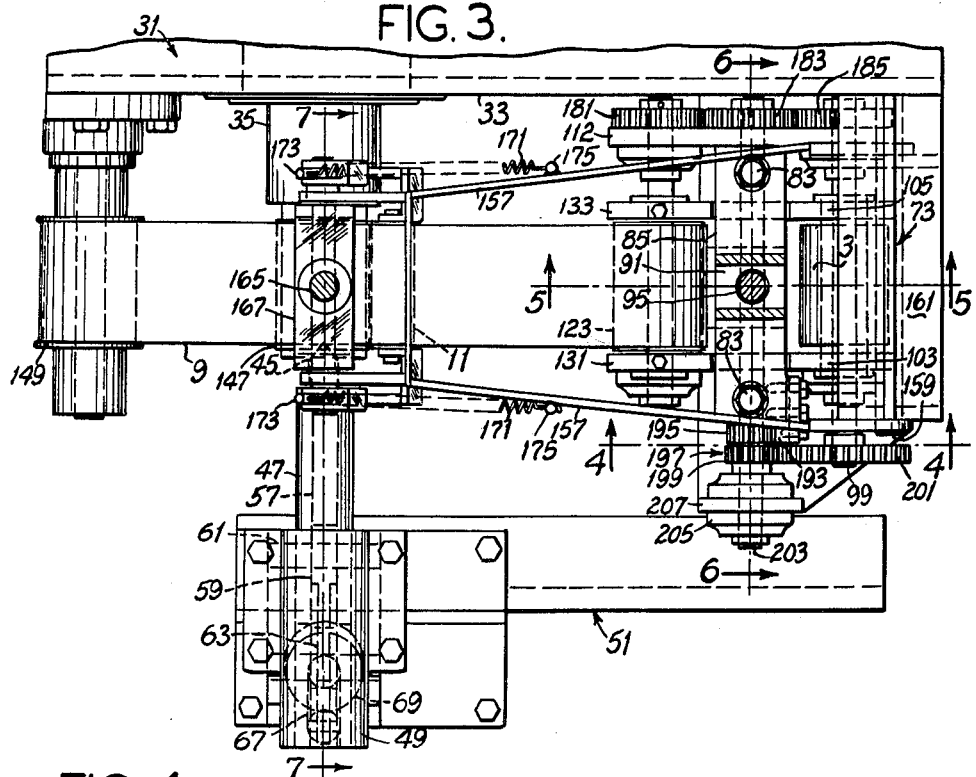
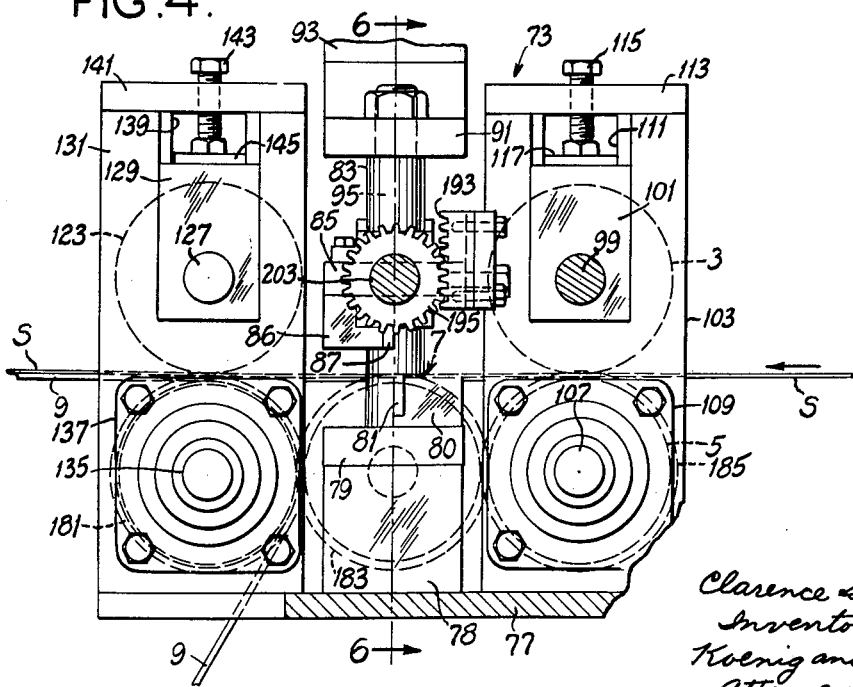
Clarence G. Duenke,
Inventor.
Koenig and Pope,
Attorneys.

Feb. 19, 1963   C. G. DUENKE   3,078,053
ELECTRICAL CORE LOOP WINDING APPARATUS
Original Filed Feb. 28, 1957   12 Sheets-Sheet 5

Clarence G. Duenke,
Inventor.
Koenig and Pope,
attorneys.

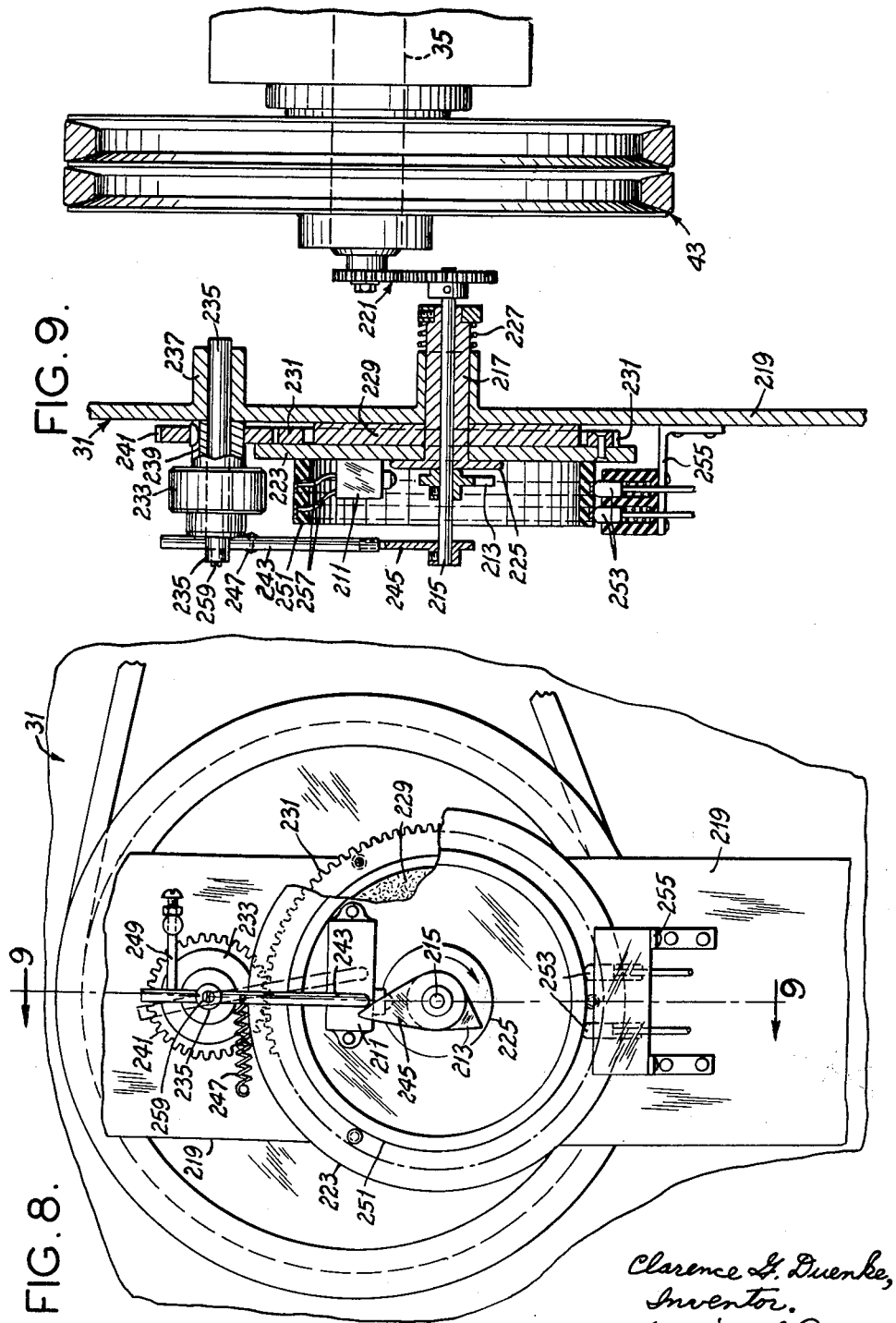

Clarence G. Duenke,
Inventor.
Koenig and Pope,
Attorneys.

Feb. 19, 1963 C. G. DUENKE 3,078,053
ELECTRICAL CORE LOOP WINDING APPARATUS
Original Filed Feb. 28, 1957 12 Sheets-Sheet 9

Clarence G. Duenke,
Inventor.
Koenig and Pope,
Attorneys.

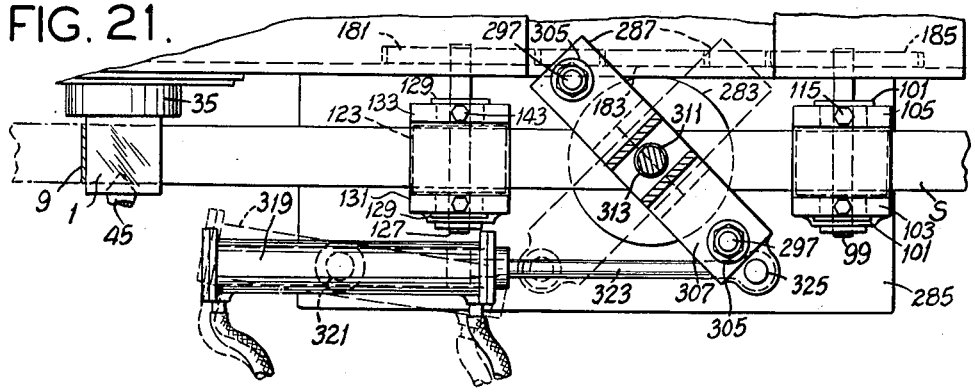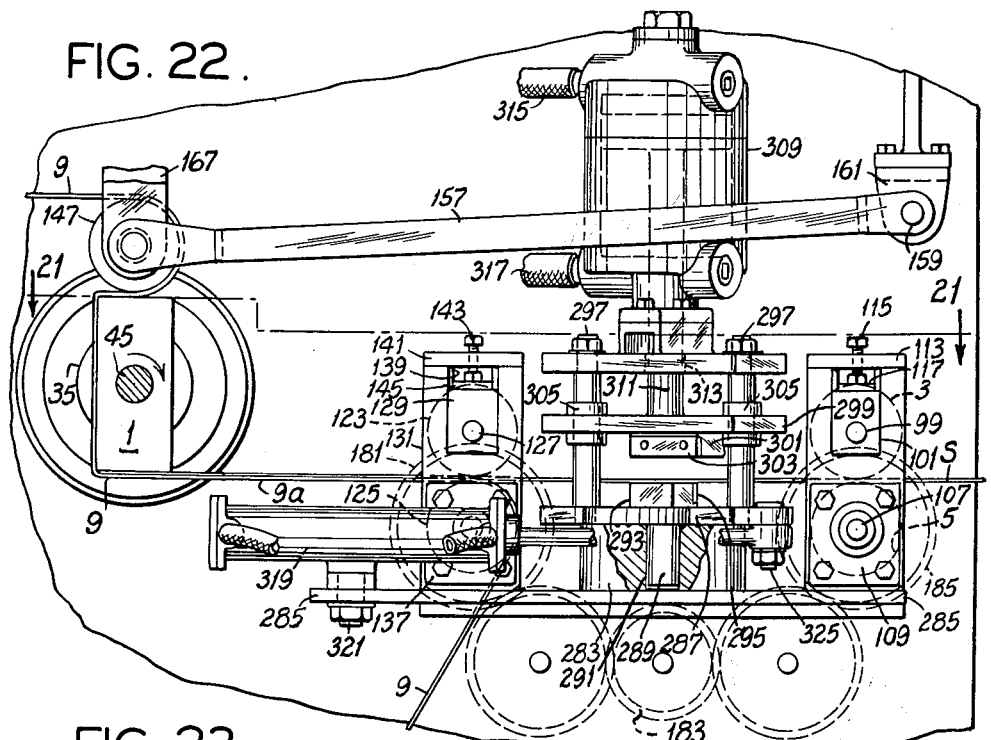

Feb. 19, 1963 C. G. DUENKE 3,078,053
ELECTRICAL CORE LOOP WINDING APPARATUS
Original Filed Feb. 28, 1957 12 Sheets-Sheet 11
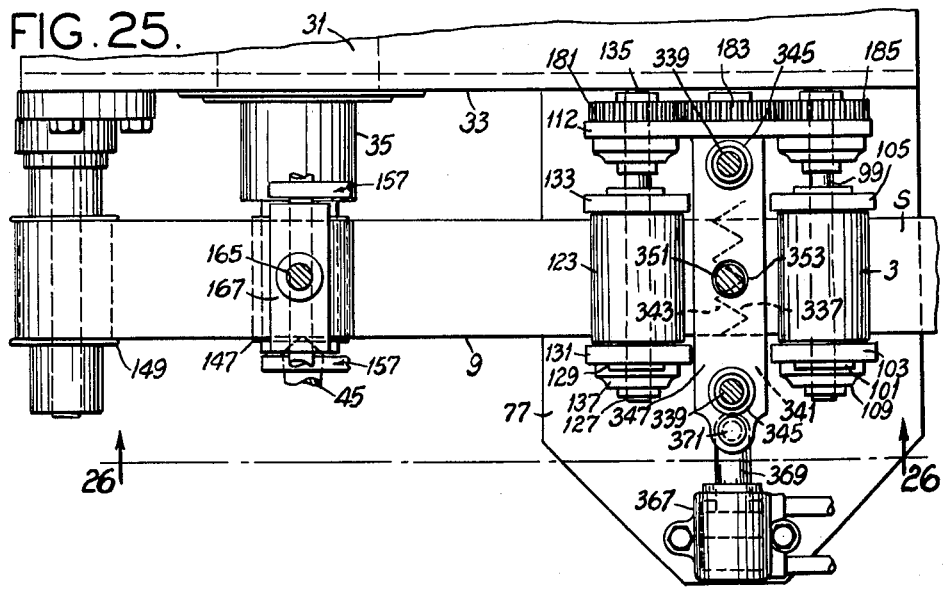
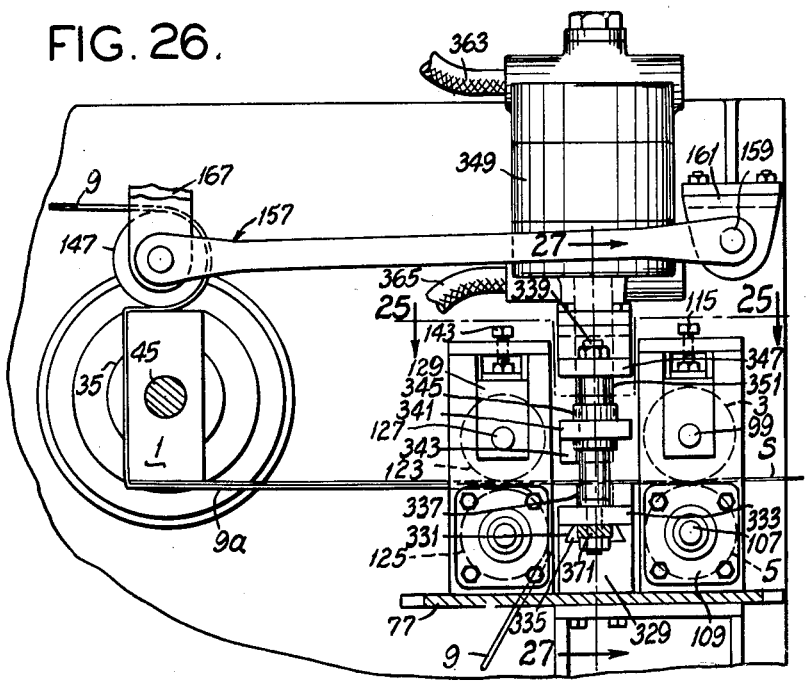
Clarence G. Duenke,
Inventor.
Koenig and Pope,
Attorneys.

Feb. 19, 1963  C. G. DUENKE  3,078,053
ELECTRICAL CORE LOOP WINDING APPARATUS
Original Filed Feb. 28, 1957  12 Sheets-Sheet 12

Clarence G. Duenke,
Inventor.
Koenig and Pope,
Attorneys.

United States Patent Office 3,078,053
Patented Feb. 19, 1963

3,078,053
ELECTRICAL CORE LOOP WINDING APPARATUS
Clarence G. Duenke, Webster Groves, Mo., assignor to Moloney Electric Company, St. Louis, Mo., a corporation of Delaware
Filed Feb. 7, 1958, Ser. No. 713,975
17 Claims. (Cl. 242—9)

This invention relates to apparatus for manufacturing magnetic core members for electrical induction apparatus, and more particularly to apparatus for manufacturing wound magnetic core loops.

This application is a division of my copending application Serial No. 643,029, filed Februray 28, 1957.

Among the several objects of the invention may be noted the provision of apparatus for manufacturing improved wound magnetic core loops, such as are used in transformers and the like, of the wound-strip lap-joint or butt-joint type and which, while being economical to manufacture, are low-loss loops and easy to assemble with preformed windings for transformers or the like; and the provision of apparatus for economically manufacturing such core loops characterized in that the joints are provided in the loop in the course of the operation of winding the loop, no operations subsequent to the winding operation being required to provide the joints. Other objects and features will be in part apparent and in part pointed out hereinafter.

The invention accordingly comprises the constructions hereinafter described, the scope of the invention being indicated in the following claims.

In the accompanying drawings, in which several of various possible embodiments of the invention are illustrated, FIG. 1 is a front elevation of an apparatus of this invention, with parts broken away;

FIG. 3 is a horizontal section taken on line 3—3 of FIG. 1;

FIGS. 4–7 are sections taken on lines 4—4, 5—5, 6—6 and 7—7, respectively, of FIG. 3, FIGS. 4–6 being on a larger scale than FIG. 3;

FIG. 8 is a view in elevation of a control mechanism of the apparatus;

FIG. 9 is a vertical section taken substantially on line 9—9 of FIG. 8;

FIG. 21 is a view similar to FIG. 3 illustrating a modification of the apparatus of this invention for manufacturing a butt-joint core loop wherein the butt joints are oblique and wherein successive butt joints are oppositely angled;

FIG. 22 is a view in elevation of FIG. 21;

FIG. 23 is a plan of a strip cut by the mechanism shown in FIGS. 21 and 22 to have oppositely angled oblique cuts;

FIG. 25 is a view similar to FIGS. 3 and 21 illustrating a modification of the apparatus for manufacturing a loop with serrated butt joints wherein successive serrated joints are laterally offset;

FIG. 26 is a view in elevation of FIG. 25;

Figure 27:
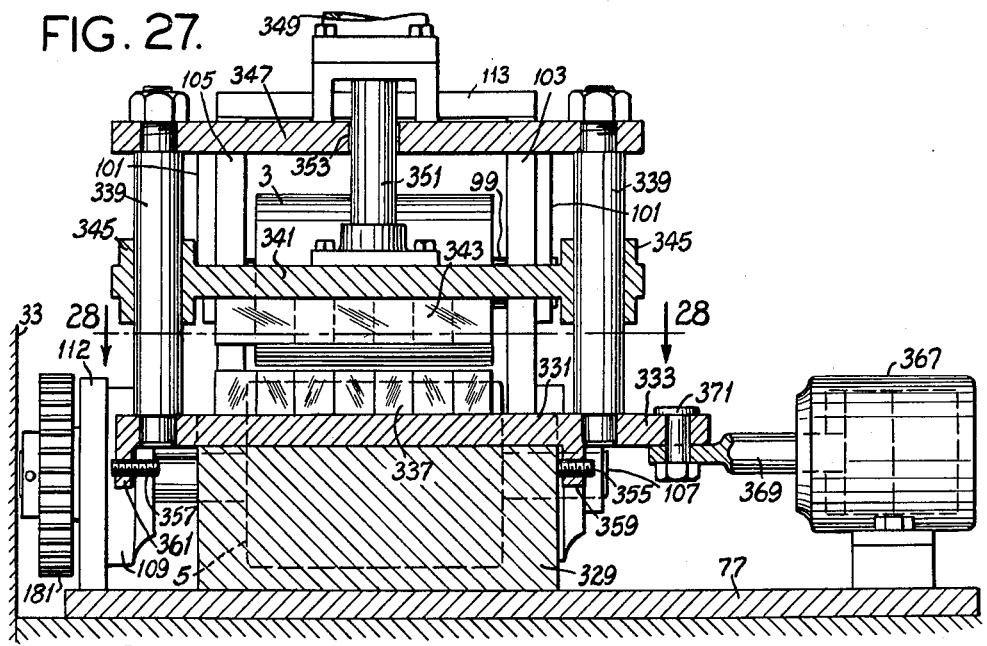
Figure 28:
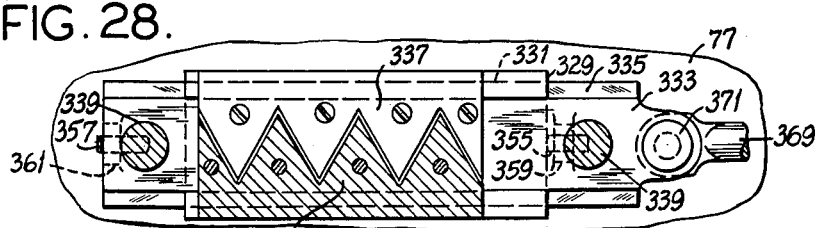
Figure 29:
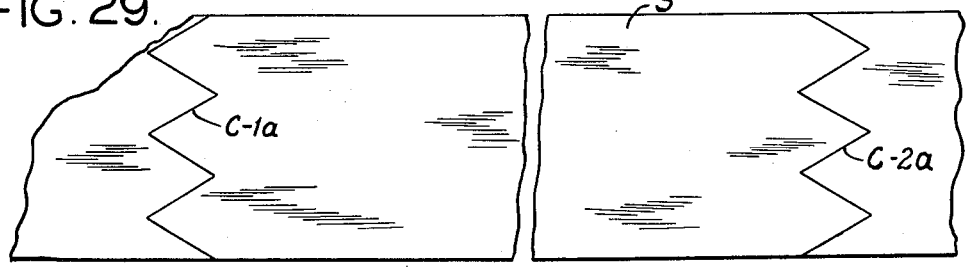
Figure 30:
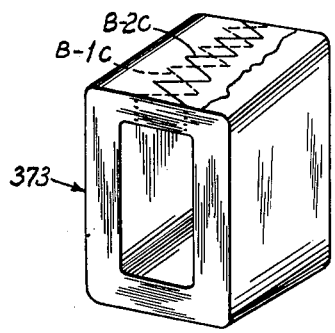

FIGS. 27 and 28 are enlarged sections taken on lines 27—27 and 28—28, respectively, of FIGS. 26 and 27;

FIG. 29 is a plan of a strip having serrated cuts made by the mechanism shown in FIGS 25–28; and, FIG. 30 is a perspective of a loop made with the mechanism shown in FIGS. 25–28.

Corresponding reference characters indicate corresponding parts throughout the several views of the drawings.

Referring to the drawings, FIGS. 1–9 illustrate an apparatus constructed in accordance with this invention for winding magnetic core loops of this invention. As shown, the apparatus generally comprises a rotatable core form 1, strip feed rolls 3 and 5, a quick-acting shear 7, an endless belt 9, and a wrapping roll 11. The core form 1 is shown as being of rectangular shape for winding rectangular core loops. Rolls 3 and 5 are adapted to feed a continuous strip S of magnetic metal (such as grain-oriented silicon steel) through the shear 7 and toward the core form 1. The strip S is withdrawn from a coil (not shown in the drawings due to space limitations, but which would be off to the right of FIG. 1). The shear is adapted to cut the strip S into individual strip segments, and these strip segments are fed to and wrapped around the core form 1 by the endless belt 9 and the wrapping roll 11, and wound one after another on the core form.

Figure 1:
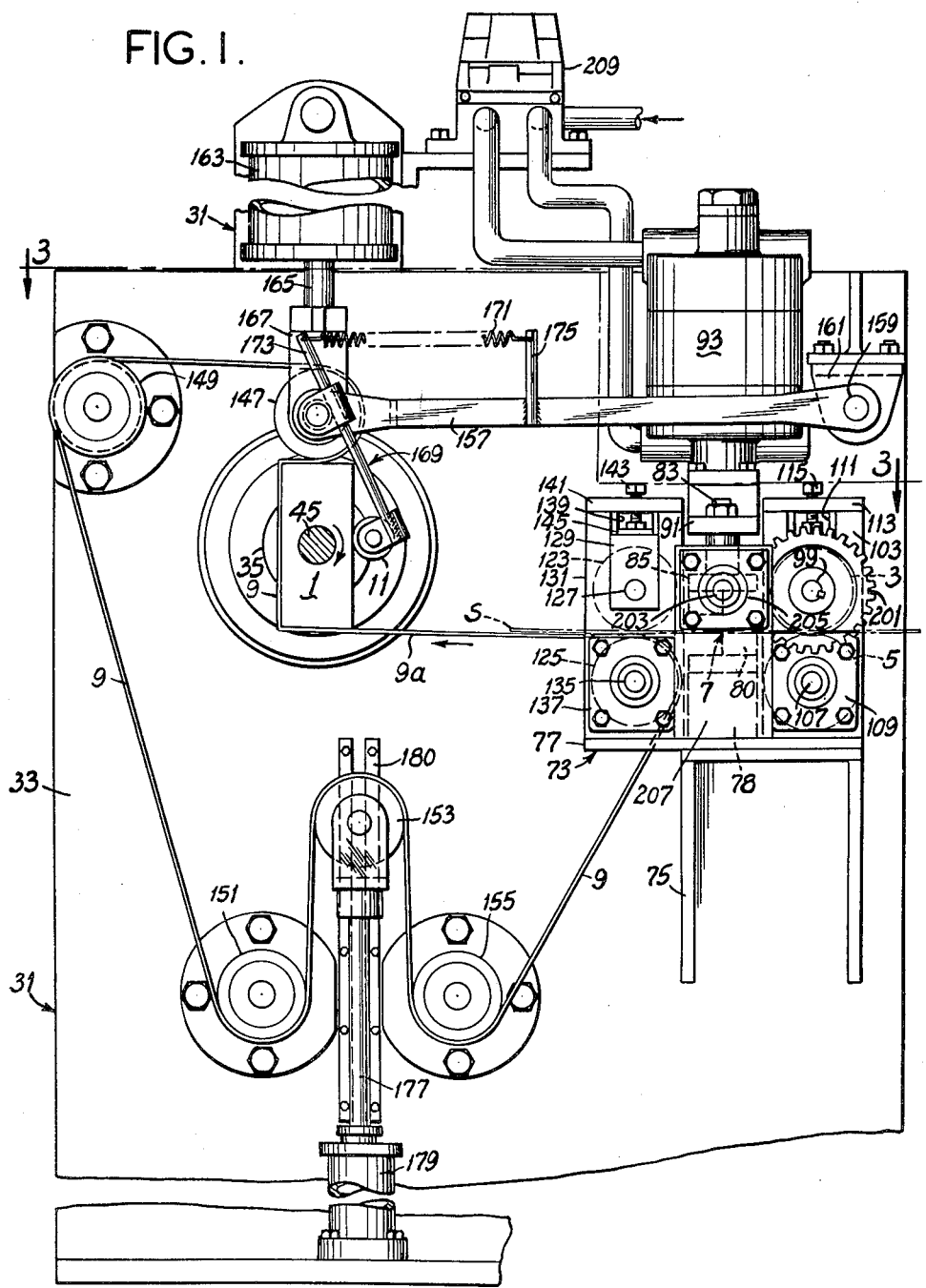
Figure 2:
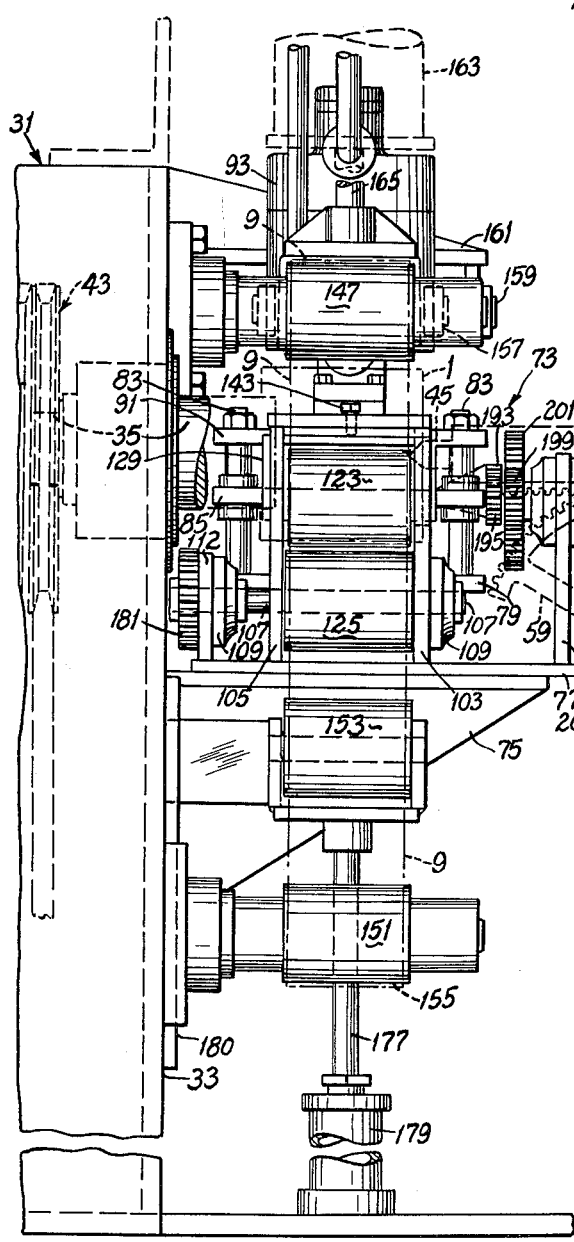
FIG. 2 is an end elevation of the apparatus, with parts broken away.
Figure 7:
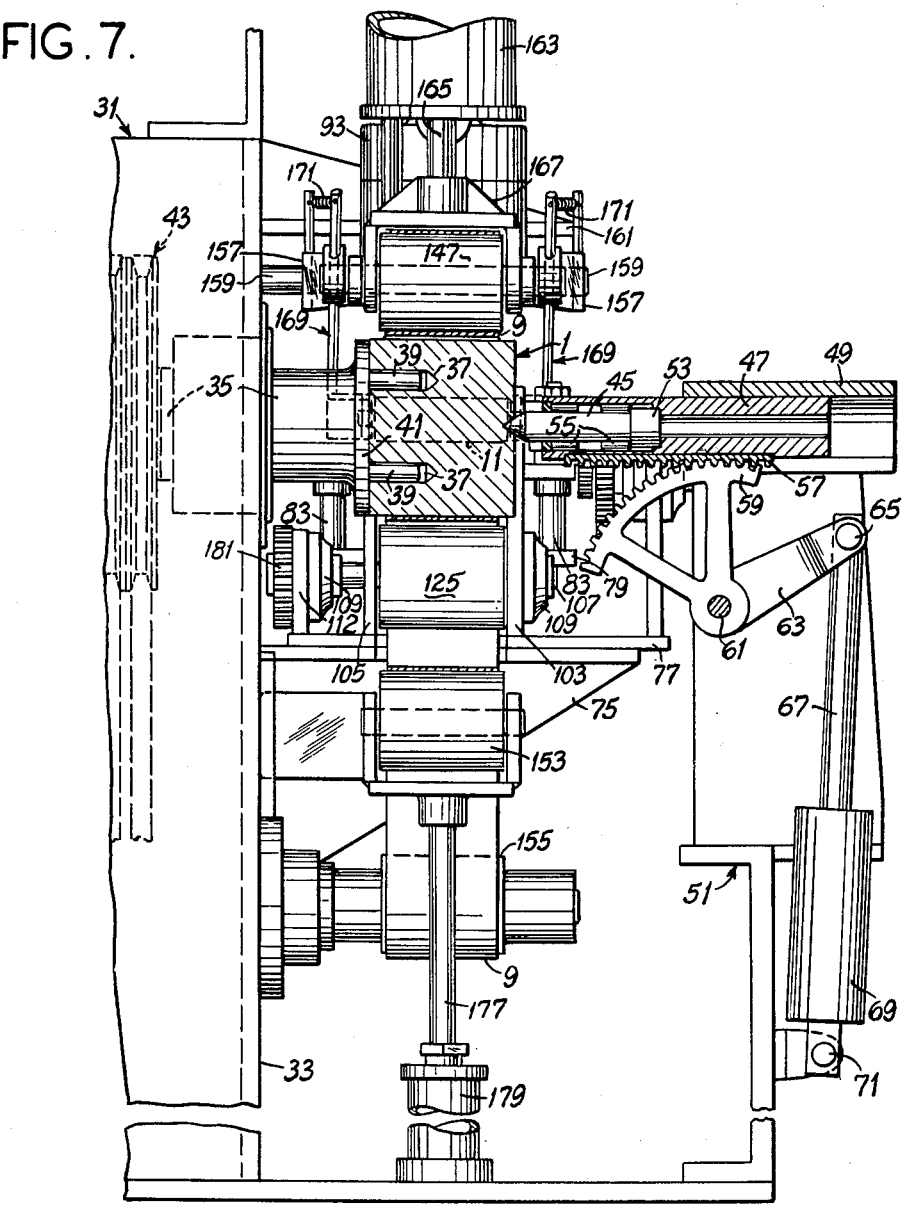

More particularly, the apparatus comprises a supporting frame generally designated 31 including a vertical front wall 33. A horizontal shaft 35 projects outward from this wall. The rectangular core form 1 is removably mounted on the outer end of this shaft. For this purpose, the core form 1 has holes 37 receiving pins 39 which project from a head 41 at the outer end of the shaft. A suitable conventional drive means, a portion of which is indicated at 43 in FIGS. 2 and 7, is provided in the rear of wall 33 for driving the shaft 35 in clockwise direction as viewed from the front (as viewed in FIG. 1). A retractable dead center 45 is provided for centering the core form 1 and holding it on the end of the shaft 35. As shown in FIG. 7, this dead center is rotary in a sleeve 47 which is axially slidable in a horizontal guide 49 at the upper end of a support 51. A thrust bearing for the dead center is indicated at 53. Annular bearings for the dead center are indicated at 55. Fixed to the sleeve 47 at its bottom is a rack 57. A sector gear 59 pivoted at 61 on the support 51 meshes with the rack. This gear has a crank arm 63 pin-connected at 65 to the upper end of a piston rod 67 which extends up from an air cylinder 69. The latter is pivoted at its lower end as indicated at 71 on the support 51. The arrangement is such that by operating the air cylinder 69 to drive the piston rod 67 down, the sleeve 47 and dead center 45 are retracted outward so as to permit removal of the core form 1 from the pins 39.

The strip feed rolls 3 and 5 and the shear 7 are part of a unit designated 73 (see FIGS. 1–6) mounted on a bracket 75 secured on the front side of wall 33. This unit 73 includes a base plate 77 fixed on the bracket 75. Fixed on the base plate 77 is a block 78. Mounted on the block 78 is a horizontal shear bed plate 79, and mounted on the bed plate 79 is a blade holder 80 to which is secured a lower horizontal fixed transverse shear blade 81. Extending up from opposite ends of the bed plate 79 are vertical posts 83. At 85 is indicated a horizontal shear head plate. Mounted on the bottom of the head plate 85 is a blade holder 86 to which is secured an upper horizontal transverse shear blade 87. The head plate 85 has vertical cylindrical guides 89 at its ends slidable on the posts 83. Spanning the posts 83 at their upper ends is a cap plate 91. Mounted on this cap plate is a vertical air cylinder 93 having a piston rod 95 extending down through an opening 97 in the cap plate and connected to the shear head plate 85. The piston rod 95 of cylinder 93 is normally retracted to hold the upper shear blade 87 in a raised retracted position above the lower shear blade 81 for passage of the strip S therebetween (see FIG. 5). The cylinder 93 is operable to drive the upper shear blade 87 downward to shear the strip, and then to return the upper shear blade to its raised retracted position.

The strip feed rolls 3 and 5 are mounted at the rearward or entrance side of the shear 7. Roll 3, which is the upper roll of the pair, is mounted on a shaft 99 journalled in bearings 101 carried by inner and outer vertical side plates 103 and 105 which extend up from the base plate 77. Roll 5, which is the lower roll of the pair, is mounted on a shaft 107 journalled in bearings 109 carried by the side plate 103 and a vertical plate 112 inward of side plate 105. The bearings 101 for the upper roll 3 are vertically slidable in slots indicated at 111 in plates 103 and 105. A cap plate 113 spans plates 103 and 105. A pressure screw 115 threaded in the cap plate backs a cross head 117 spanning bearings 101. Incorporated in rolls 3 and 5 are overrunning clutches 119 and 121 which permit rolls 3 and 5 to overrun shafts 99 and 107 in strip feeding direction.

Upper and lower feed rolls 123 and 125 are provided on the forward or exit side of the shear 7. The upper roll 123 is mounted on a shaft 127 journalled in bearings 129 carried by inner and outer vertical side plates 131 and 133 which extend up from the base plate 77. The lower roll 125 is mounted on a shaft 135 journalled in bearings 137 carried by the plates 131 and 112. The bearings for the upper roll are vertically slidable in slots indicated at 139 in plates 131 and 133. A cap plate 141 spans plates 131 and 133. A pressure screw 143 threaded in the cap plate 141 backs a crosshead 145 spanning the bearings 137.

The endless belt 9 is trained around the roll 125, the core form 1, and around rolls 147, 149, 151, 153 and 155. The location of the roll 125 relative to the core form is such as to provide the general horizontal reach 9a of the belt from the roll 125 to the core form. The belt passes around the bottom of the core form, then up around the forward side of the core form, then back over the top of the core form and up around the roll 147. From roll 147 it passes forward over the roll 149, then downward to and up around the roll 151 to the roll 153, then around the roll 153 and downward to the roll 155, then around the roll 155 and upward to the roll 125. It is guided at one point, as at roll 149 which is shown as having flanges for belt-guiding purposes.

The roll 147 is mounted at the forward end of a frame 157 pivoted for swinging movement on a horizontal axis as indicated at 159 on a bracket 161 which is attached to the wall 33. The frame 157 straddles the air cylinder 93. The frame 157 and the roll 147 are biased downward to maintain the portion of the belt passing under the bottom of the roll 147 in pressure engagement with the core form by means of an air cylinder 163 mounted on the wall 33 and having its piston rod 165 extending downward to a connection at 167 with the frame 157. The roll 11 is carried by a frame 169 pivoted on the frame 157 on the axis of the roll 147, and biased into engagement with the rearward side of the core form 1 by springs 171 attached at 173 and 175 to the frames 169 and 157. The rolls 149, 151 and 155 are fixed-axis belt guide rolls, and the roll 153 is a belt tensioning roll, being mounted at the upper end of a piston rod 177 which projects upward from an air cylinder 179. Air pressure is maintained in this cylinder 179 for biasing the roll 153 in upward direction to maintain the belt tensioned. A guide for the roll 153 is indicated at 180 on the wall 33. Rolls 147 and 153 may be retracted by appropriate operation of the cylinders 163 and 179 to disengage the belt from the core form 1 for the removal of the core form.

The belt 9 is driven by the core form 1, and drives the roll 125 at a speed related to the speed of the core form. The roll 125 is adapted to drive the roll 5 in strip feeding direction through a gear train comprising a gear 181 on the shaft 135, an idler gear 183, and a gear 185 on the shaft 107. The idler gear 183 is rotary on a stub shaft 187 carried by plate 112. Means is provided for driving the roll 3 faster than the roll 125 following each cutting of the strip S by the shear 7. As shown best in FIGS. 3, 4 and 6, this means comprises a vertical rack 193 fixed on the shear head plate 85 in mesh with a gear 195 of a two-gear cluster 197. The other gear 199 of this cluster meshes with a gear 201 on the shaft 99. The cluster 197 is mounted on a shaft 203 journalled in a bearing 205 carried by a vertical plate 207 extending up from the base plate 77 toward the outer edge of the latter. The arrangement is such that when the shear head plate 85 is driven downward by cylinder 93, the rack 193 rotates the cluster 197 in clockwise direction as viewed in FIG. 4 thereby rotating the gear 201 and shaft 99 in counterclockwise direction. With the overrunning clutch 119 in roll 3, however, this rotation of the shaft 99 has no effect on the roll 3. When the shear head plate 85 moves upward following the cutting operation, the rack 193 rotates the cluster 197 in counterclockwise direction, thereby rotating the gear 201 and shaft 99 in clockwise direction, and the shaft 99 acts through the overrunning clutch 119 to drive the roll 3 in clockwise (strip-feeding) direction at higher speed than the roll 125.

As illustrated in the drawings, means is provided for operating the air cylinder 93 to operate the shear 7 to cut the strip S into individual strip segments with each successive segment slightly longer than the preceding segment. This means includes a solenoid valve 209 (see FIG. 1) controlling the operation of cylinder 93 and in turn controlled by a switch 211 (see FIGS. 8 and 9). This switch 211 is operated by a cam 213 on a shaft 215 journalled in a bearing 217 in a vertical plate 219 carried by frame 31. Shaft 215 is driven from the core form drive shaft 35 via a gear train 221. This gear train is shown as being one having a reduction ratio such that shaft 215 makes one revolution for every one and one-half revolutions of the core form drive shaft 35, for winding a lap-joint core loop with each of the cut-off segments of the strip S taking one and one-half turns around the loop (in a manner to be subsequently described). The shaft 215 and cam 213 rotate clockwise as viewed in FIG. 8. It will be understood that for winding loops with the cut-off segments taking other than one and one-half turns, other gear trains would be used at 221 providing the appropriate reduction ratio. For example, for winding a loop with the cut-off segments taking two turns around the core form, the reduction ratio would be two to one.

The switch 211 is mounted on a disk 223 which is rotary on the bearing 217. The bearing 217 is axially slidable in the plate 219 and has a flange 225 at its outer end engaging the disk 223. A spring 227 biases the bearing 217 and the disk 223 toward the right as viewed in FIG. 9 for frictional engagement of the disk 223 with a disk 229 of friction material interposed between the disk 223 and the plate 219. A ring gear 231 is fixed to the disk 223. At 233 is indicated a one-way clutch, the inner race of which is fixed on a shaft 235 journalled in the plate 219 as indicated at 237. Fixed to the outer race 239 of this clutch is a pinion 241 in mesh with the ring gear. The shaft 235 carries a radial arm 243 engageable by a cam 245 on the shaft 215 once each revolution of the latter. The cam 245 trails the cam 213. A spring 247 biases the arm 243 to a retracted position determined by engagement of the arm with a stop 249. The disk 223 also carries a collector ring 251 engaged by brushes 253 carried by a bracket 255 on the plate 219, with connections such as indicated at 257 from the collector ring to the switch 211.

Once each revolution of the shaft 215, and following the actuation of the switch 211 by the cam 213, the cam 245 engages the arm 243 and rotates the shaft 235 in counterclockwise direction as viewed in FIG. 8 through a small fraction of a revolution before it rides off the arm 243. This effects rotation of the outer race 239 of the clutch 233 and pinion 241 in counterclockwise direction as viewed in FIG. 8 to rotate disk 223 and switch 211 carried thereby clockwise through a small fraction of a revolution. When the cam 245 rides off the arm 243, the arm returns to its retracted position, the one-way clutch 233 permitting this without reverse rotation of the pinion 241. Thus, once during each revolution of the shaft 215 (once during each one and one-half revolutions of the core form 1), the switch 211 is advanced from its previous position a small amount. This advance occurs after cam 213 has operated the switch 211. Arm 243 is adjustable in shaft 235, being held in adjusted position by a set screw 259, to adjust the advance of the switch.

The reason that provision is made for advancing the switch 211 after each cutting operation with consequent delay of the next cutting operation is as follows: If the switch 211 were fixed in position and operated without such delay once every revolution (360° of rotation) of the cam 213 (one and one-half revolutions of the core form 1), the distance measured along the strip S from the cutting line 13 of the shear 7 to the forward end of the strip would be somewhat shorter than that required for full one and one-half turns, and the laps would be distributed around the loop. This is because the shear operates to cut off a segment of strip S before the segment is completely wound on the core form 1, and hence before the thickness of the strip material on the core form 1 has become such that one and one-half revolutions of the core form will draw forward enough of the strip to make a full one and one-half turn segment. Advancing the switch after each cutting operation delays the next cutting operation until the core form has rotated through slightly more than one and one-half revolutions, so that the length of the portion of the strip from the cutting plane 13 of the shear to the forward end of the strip at the instant of operation of the shear is that required for one and one-half turns.

The above-described apparatus is a basic machine adapted for the manufacture of a variety of magnetic core loops by a novel method common to all the loops, namely, the winding or coiling of a succession of disconnected strip segments of magnetic material one after another with each successive strip segment having its leading end portion engaging the trailing end portion of the preceding strip segment. It can be used to make a lap-joint type of core loop, i.e., one in which each successive strip segment has its leading end portion lapping the trailing end portion of the preceding strip segment. It can be used to make a butt-joint type of core loop, i.e., one in which each successive strip segment has its leading end butted against the trailing end of the preceding strip segment.

Figure 10:
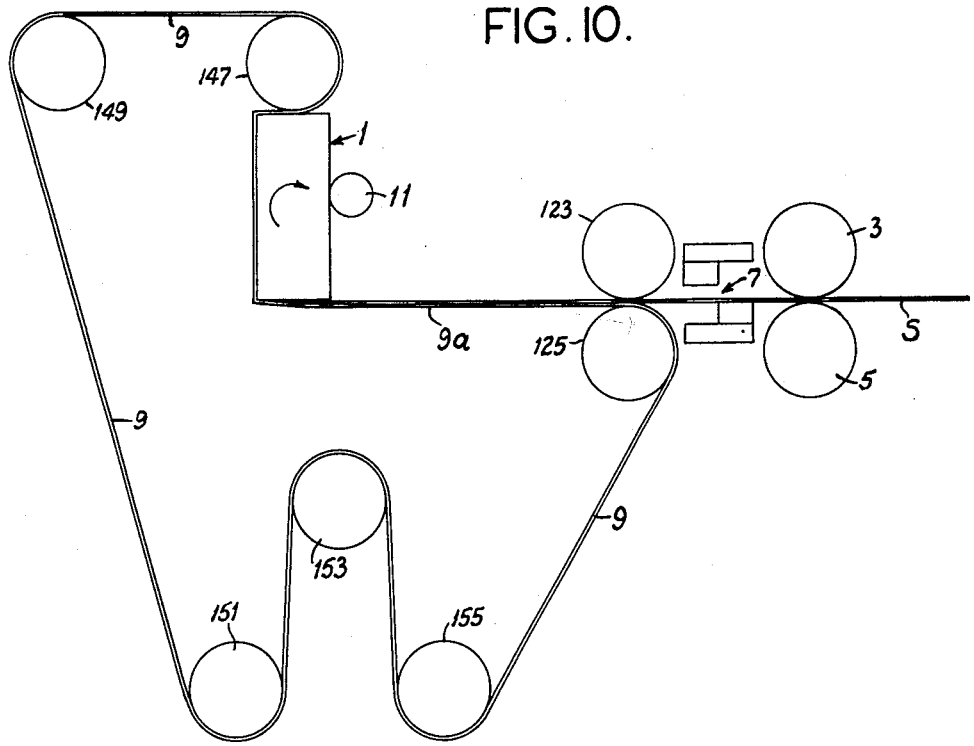
FIGS. 10–13 are diagrammatic views illustrating progressive stages in the manufacture of a lap-joint magnetic core loop by apparatus of this invention.
Figure 11:
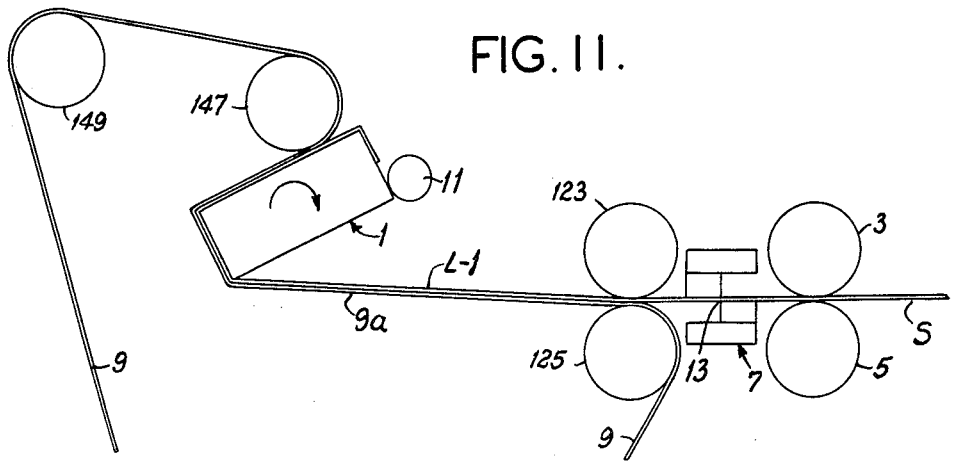
Figure 12:
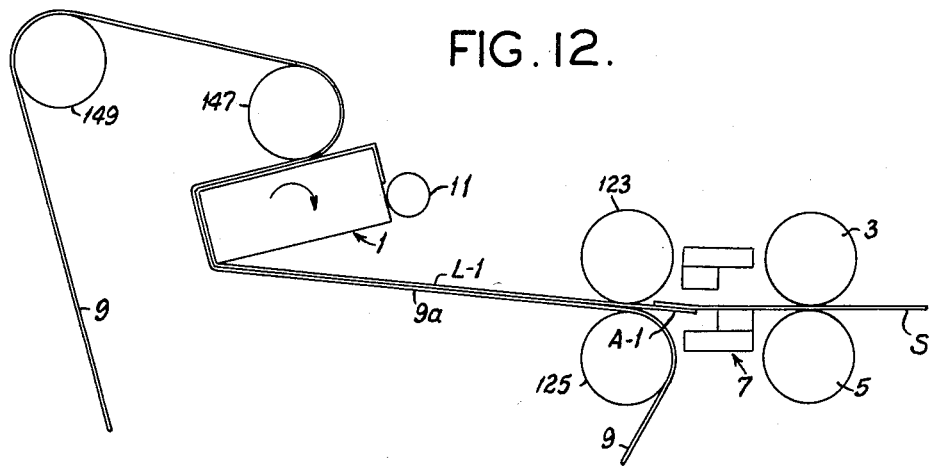

FIGS. 10–13 diagrammatically illustrate the operation of the machine in making a lap-joint magnetic core loop in which each successive disconnected strip segment takes one and one-half turns around the loop and in which successive laps are displaced 180° around the loop, being located in the narrow end portions or yokes of the loop. The resultant loop is shown in FIG. 14. FIG. 10 shows the starting of the winding of a loop on the core form 1. The strip S is shown extending through the feed rolls 3 and 5 and the shear 7 to the core form 1 over a reach 9a of the belt. The form 1 rotates in the direction of the arrow shown in FIGS. 10–13 and pulls the strip forward through the shear. As shown in FIG. 11, when the form has rotated through such an angle that the length of the portion of the strip extending from the cutting plane 13 of the shear to the end of the strip is equal to one and one-half times the perimeter of the core form 1, the shear 7 is operated to cut the strip to form a strip segment L–1. The shear then opens, and the relative speed of the cut-off segment L–1 and the strip S is then momentarily varied to effect lapping of the leading end of the strip and the trailing end of the cut-off segment L–1 (see FIG. 12). This lap is designated A–1. The stated variation in relative speed is effected by momentarily speeding up the feed rolls 3 and 5 momentarily to speed up the strip S relative to the segment L–1.

Figure 13:
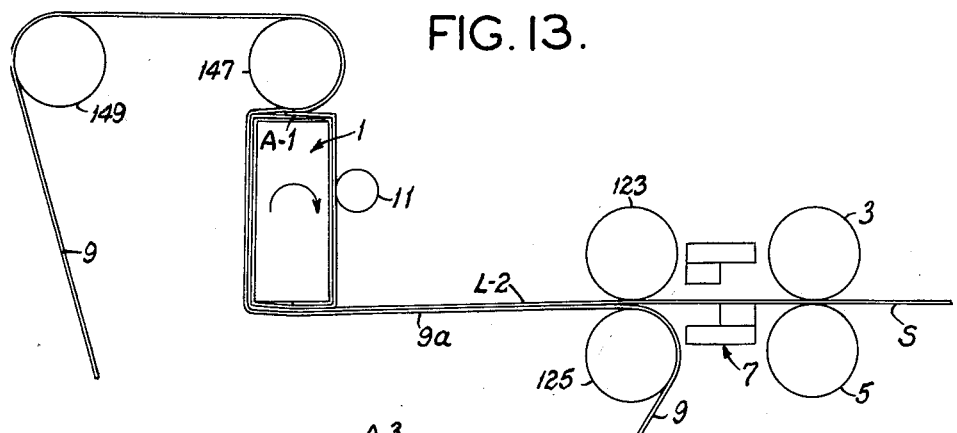
Figure 14:
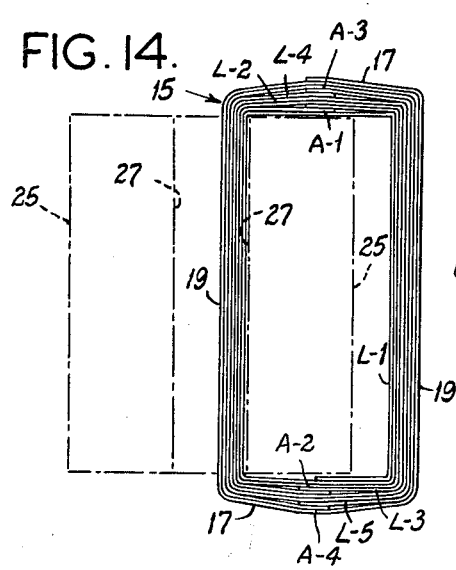
FIG. 14 is a view in elevation of the lap-joint magnetic core loop wound in accordance with FIGS. 10–13, showing in phantom a preformed winding with which the loop is assembled.

Then, with continued rotation of the core form 1, the cut-off segment L–1 is completely wound on the form, and winding of the strip S on the form is resumed (see FIG. 13). When the form 1 has rotated through such an angle that the length of the portion of the strip extending from the cutting plane 13 of the shear to the lap A–1 is equal to one and one-half times the perimeter of the wound-up first segment L–1, the shear is operated to cut the second segment L–2. The shear then opens, and the relative speed of the cut-off segment L–2 and the strip S is then momentarily varied to effect lapping of the leading end of the strip and the trailing end of the cut-off segment L–2. This lap is designated A–2 (see FIG. 14). Then, with continued rotation of the core form 1, the cut-off segment L–2 is completely wound on the form. Since segments L–1 and L–2 take one and one-half turns around the form, laps A–1 and A–2 are displaced 180° around the loop.

The above-described operations are continued until as many strip segments have been wound on the core form as are necessary to produce the desired build for the magnetic core loop. FIG. 14 shows a loop 15 consisting of five strip segments L–1, L–2, L–3, L–4 and L–5 wound on the core form. Since each segment takes one and one-half turns around the resultant loop, the loop 15 has seven and one-half turns, but only four laps, which appear at A–1, A–2, A–3 and A–4. It will be understood that a loop will usually have more turns than this, but this number has been selected for simplifying the drawings and description. Also, as shown in FIG. 14, the laps are located in the narrow end portions 17 of the rectangular core loop 15, these being the yokes of the core loop, the long sides or legs 19 of the core loop being free of laps.

The details of the operation of the apparatus in carrying out the above-described method are as follows:

At the start of the winding of a core loop, the strip S extends through rolls 3 and 5, the shear 7, between roll 123 and the belt 9, and over the reach 9a of the belt to the core form 1, with its forward end caught between the belt and the core form. Upon rotation of the core form (in clockwise direction as viewed in FIG. 1), the strip starts winding up on the core form. The belt 9 and roll 11 wrap the strip around the core form. The core form is driven at a substantially constant angular velocity and drives the belt at a linear speed which varies during each revolution of the core form due to the rectangular shape of the core form and which varies as strip material builds up on the form. The belt 9 drives roll 125, and roll 125 drives roll 5 via the gear train 181, 183 and 185. Since roll 125 is driven by the belt 9, which is in turn driven by the core form 1, the speed at which strip S is fed forward by the rolls 3 and 5 corresponds to the speed at which it is taken up by the core form. If desired, a thread or paper strip (not shown) may be wound up with the strip to effect a slight separation of the convolutions of the loop for facilitating subsequent annealing of the loop, the thread or strip burning out during the annealing.

When the core form 1 has rotated through such an angle from its starting position that the length of the portion of the strip S extending from the cutting plane 13 of the shear is equal to one and one-half times the perimeter of the core form, the cam 213 at that instant engages switch 211 to energize the solenoid valve 209 and operate the air cylinder 93 to operate the shear 7 to cut off a segment of strip L–1 corresponding to that previously described herein. Operation of the shear 7 is effected by the piston rod 95 driving down the shear head plate 85 and the upper shear blade 87 carried by plate 85. As the plate 85 moves down, the rack 193 carried thereby rotates the cluster 197 in clockwise direction as viewed in FIG. 4, but this is not effective to rotate roll 3 because of the interposition of the one-way clutch 119 between the cluster and the roll 3. When the cam 213 rides off the switch 211 after the cutting has been completed, the solenoid valve 209 is de-energized and the piston rod 95 reverses and travels back upward to retract the plate 85 and the upper shear blade 87. Upon such retraction, the rack 193 rotates the cluster 197 in counterclockwise direction as viewed in FIG. 11 to drive the gear 201 and shaft 99 in clockwise direction at relatively high speed. The shaft 99 thereupon acts through the one-way clutch 119 to drive the roll 3 momentarily to speed it up and speed up the strip S to effect the lapping A–1 of the leading end of the strip and the trailing end of the cut-off segment L–1.

Following this, the cam 245 engages the arm 243 to effect rotation of the disk 223 and advance of the switch 211 through a small angle corresponding to the increment of length which must be added to the next segment L–2 to be cut in view of the build-up of strip material on the core form to avoid offsetting of the next lap A–2 from the lap A–1. This means that cam 213 must rotate slightly more than 360° from the point where it first actuated switch 211 to the point where it next actuates switch 211. Thus, the next operation of the shear 7 is delayed until slightly after the core form has completed its next cycle of rotation through one and one-half turns (an angle of 540°).

Following the operation of the shear 7 to cut off the segment L–1 and the lapping at A–1 of the cut end of the strip with the trailing end of segment L–1, the winding up of segment L–1 on the core form is completed, and the strip is fed forward toward the core form by rolls 3 and 5 and the roll 123 and the belt 9 at the same speed as segment L–1 so that the lap is maintained. The cut end of the strip becomes caught between the belt and the core form and winding of the strip on the form overlying the segment L–1 is initiated, the belt and roll 11 wrapping the strip around the form overlying the segment L–1.

Then, when the core form 1 has rotated through such an angle (slightly more than 540°) from the point where segment L–1 was cut off, the cam 213 engages the switch 211 to operate the shear 7 to cut off segment L–2 of the strip. This angle is such that segment L–2 is longer than segment L–1 and is adapted to take one and one-half turns around the loop. Following the cutting off of segment L–2, the roll 3 is speeded up in the same manner as previously described to speed up the strip and effect the lapping at A–2 of the leading end of the strip and the trailing end of the segment L–2. Then the switch 211 is again advanced as previously described to delay the next operation of the shear 7 until slightly after the core form 1 has completed its next cycle of rotation through one and one-half turns.

Rotation of the core form 1 is continued until as many segments L–1, L–2 etc. have been wound on the form as to provide a loop of the desired build. It will be understood that the segments are cut successively longer in an amount such that each takes one and one-half turns around the loop, as a result of which the laps A–1, A–2 etc. are diametrically aligned and confined to the yokes of the loop.

An important novel feature of the core loop 15 shown in FIG. 14 is that it has fewer laps than turns. This effects considerable savings over prior lap-joint core loops in the amount of strip required for a loop of given capacity, not only because there is less strip material in the laps, but also because there is less localized bulging of successive turns due to the laps, which means that the successive turns of a core loop of the type represented by core loop 15 are of relatively smaller length than the successive turns of prior types of lap-joint core loops.

Figure 16:
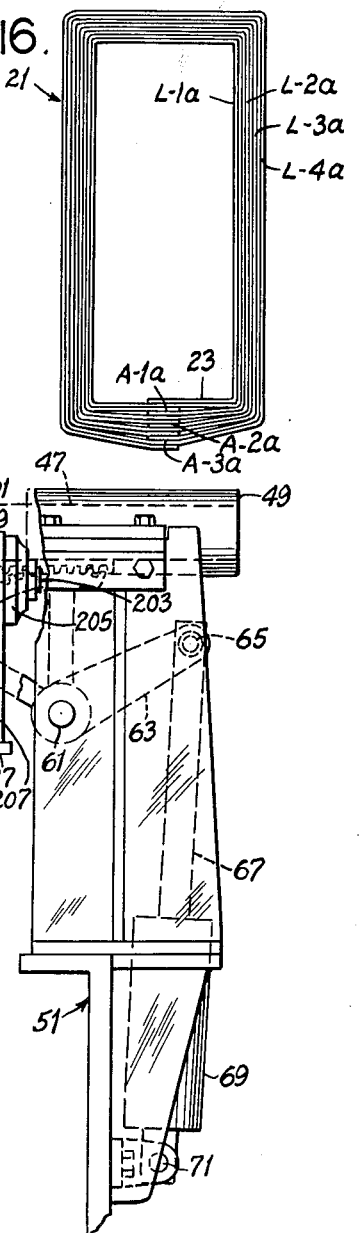
FIG. 16 is a view in elevation of another lap-joint core loop made by apparatus of this invention.
Figure 5:
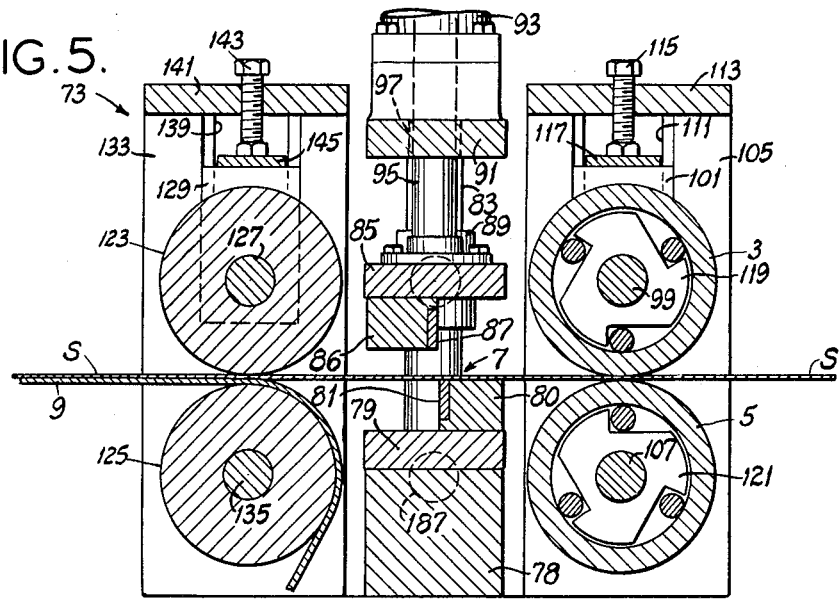
Figure 6:
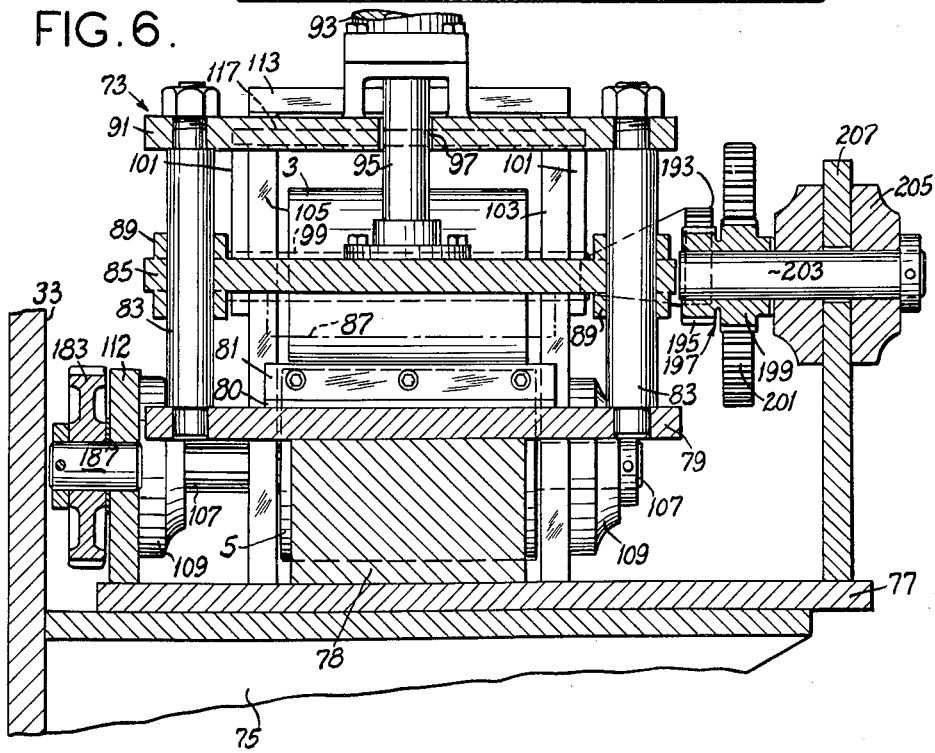

It will be understood that so far as the wound-strip lap-joint type of core made by apparatus of this invention is concerned, the requirement for fewer laps than turns is met by having each successive cut-off strip segment extend more than a full turn around the loop. For example, each segment may extend a whole number of turns plus one-half a turn (one and one-half, two and one-half, three and one-half turns, etc.) around the loop, in which case the laps may be distributed between the two yokes of the loop. Or each segment may extend two or a higher whole number of turns around the loop, in which case all the laps may be located in one yoke of the loop. The machine is adapted for winding loops with the cut-off segments extending any desired degree around the loop simply by changing gears at 221 to obtain different ratios as between shafts 35 and 215. In general, it is undesirable that there be any laps in the legs of the loop. FIG. 16 shows a loop 21 comprising four two-turn segments L–1a, L–2a, L–3a and L–4a, the loop thus having eight turns, with three laps A–1a, A–2a and A–3a in one yoke 23 of the loop.

Figure 15:
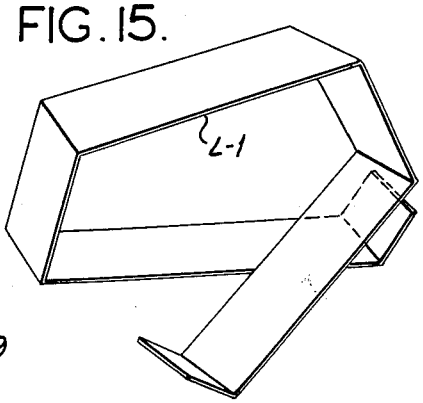
FIG. 15 is a perspective view illustrating a step in the assembly of the FIG. 14 loop with the preformed winding.

A core loop such as indicated at 15 in FIG. 14 is readily assembled with a preformed winding such as indicated in phantom at 25 in FIG. 14 by removing the first segment L–1 from within the loop, bending it open as shown in FIG. 15, inserting one end of the segment through the opening 27 in the winding 25, then permitting the segment L–1 to spring back to its original rectangular form. Then the second segment L–2 is removed and bent open, and one end inserted through the opening in the winding, after which the segment L–2 is permitted to spring back to its original rectangular form surrounding segment L–1. This mode of operation is continued until all the segments have been assembled with the winding (and reassembled with one another).

Figure 17:
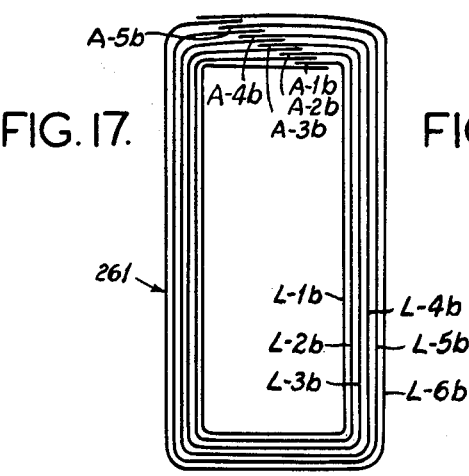
FIG. 17 is a diagrammatic elevation of still another lap-joint core loop.

The machine is also adapted to wind a core loop of the lap-joint type in which the laps are offset from one another (i.e., distributed around the loop) by omitting the advancing mechanism for switch 211 and keeping this switch stationary. FIG. 17 illustrates such a loop (designated 261) comprising six one-turn segments L–1b, L–2b, L–3b, L–4b, L–5b and L–6b with offset laps A–1b, A–2b, A–3b, A–4b, A–5b.

Figure 19:
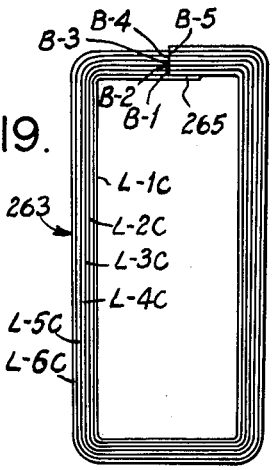
FIG. 19 is a view in elevation of one type of butt-joint core loop which may be wound in accordance with FIG. 18.
Figure 18:
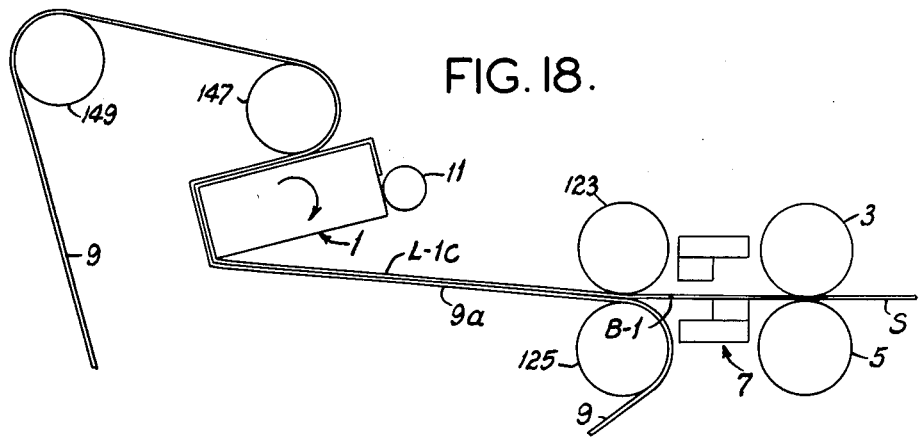
FIG. 18 is a diagrammatic view illustrating a stage in the manufacture of a butt-joint magnetic core loop.

The machine is also adapted for winding a core loop of the butt-joint type by omitting the mechanism (rack 193 etc.) for momentarily speeding up the strip after each cutting operation. FIG. 18 illustrates this, showing a first strip segment L–1c as having been cut off by the shear 7 and the strip S having its leading end butting against the trailing end of segment L–1c as indicated at B–1. FIG. 19 illustrates one type of butt-joint core loop (designated 263) which may be wound wherein all the butt joints are coplanar and located in one of the yokes of the loop. This is wound using the advancing mechanism for switch 211 and omitting the mechanism for momentarily speeding up the strip after each cutting operation. In the loop 263, the first segment L–1c is made somewhat longer than one full turn so that its leading and trailing ends overlap as indicated at 265. The remaining segments L–2c, L–3c, L–4c, L–5c and L–6c are one-turn butted segments. The leading end of segment L–2c butts against the trailing end of segment L–1c at a butt joint B–1. The leading end of segment L–3c butts against the trailing end of segment L–2c at a butt joint B–2. The leading end of segment L–4c butts against the trailing end of segment L–3c at a butt joint B–3. The leading end of segment L–5c butts against the trailing end of segment L–4c at a butt joint B–4. The leading end of segment L–6c butts against the trailing end of segment L–5c at a butt joint B–5. The butt joints B–1 to B–5 are coplanar in what may be regarded as a radial plane of the core loop. They all lie in a yoke of the loop, their plane being at right angles to the yoke.

Figure 20:
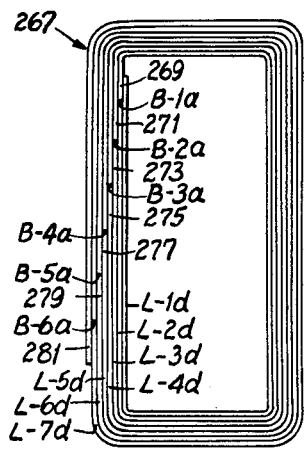
FIG. 20 is a view in elevation of another butt-joint core loop.

FIG. 20 illustrates another type of butt-joint core loop (designated 267) which may be wound wherein the butt joints are offset (i.e., distributed around the loop). This is wound omitting both the advancing mechanism for switch 211 and the mechanism for momentarily speeding up the strip after each cutting operation. In the loop 267, seven strip segments are shown, designated L–1d, L–2d, L–3d, L–4d, L–5d, L–6d and L–7d. Each strip has its trailing end overlying its leading end as indicated at 269, 271, 273, 275, 277, 279 and 281. The leading end of segment L–2d butts against the trailing end of segment L–1d at a butt joint B–1a. The leading end of segment L–3d butts against the trailing end of segment L–2d at a butt joint B–2a. The leading end of segment L–4d butts against the trailing end of segment L–3d at a butt joint B–3a. The leading end of segment L–5d butts against the trailing end of segment L–4d at a butt joint B–4a. The leading end of segment L–6d butts against the trailing end of segment L–5d at a butt joint B–5a. The leading end of segment L–7d butts against the trailing end of segment L–6d at a butt joint B–6a. Butt joint B–2a is offset from butt joint B–1a, butt joint B–3a is offset from butt joint B–2a, etc. As shown in FIG. 20, all the butt joints are located in one leg of the loop.

It will be understood that the butt-joint loops such as 263 and 267 are readily assembled with a preformed winding by bending them open for insertion in the opening of the winding.

FIGS. 21 and 22 illustrate a modification of the machine for winding butt-joint core loops similar to the loop 263 except that the butt joints, instead of being at right angles to the length of the strip segments in the loop, are oblique with successive butt joints oppositely angled. For this purpose, the shear is modified to be oscillable about a vertical axis and means is provided for swinging the shear between oppositely angled positions during the intervals between successive operations of the shear. As shown, the shear comprises a block 283 fixed on a base plate 285 corresponding to base plate 77 (but somewhat longer than base plate 77). Oscillable in a horizontal plane on the top of the block 283 is a horizontal shear bed plate 287 having a pin 289 extending into a socket 291 in the block and rotary in the socket. Fixed on the shear bed plate 287 is a blade holder 293 to which is secured a lower horizontal shear blade 295. Extending up from opposite ends of the shear bed plate 287 are vertical posts 297. At 299 is indicated a horizontal shear head plate. Mounted on the bottom of the head plate 299 is a blade holder 301 to which is secured an upper horizontal shear blade 303. The head plate 299 has vertical cylindrical guides 305 at its ends slidable on the posts 297.

Spanning the posts 297 at their upper ends is a cap plate 307. Mounted on this cap plate is a vertical air cylinder 309 (corresponding to cylinder 93) having a piston rod 311 extending down through an opening 313 in the cap plate and connected to the shear head plate 299. The piston rod 311 is normally retracted to hold the upper shear blade 303 in a raised retracted position for passage of the strip S. The cylinder 309 is operable to drive the upper shear blade 303 downward to shear the strip, and then to return the upper shear blade to its raised retracted position. The plates 287, 299 and 307 and the cylinder 309 are oscillable as a unit, the connections 315 and 317 to the cylinder being flexible hose lines permitting oscillation of the cylinder.

A horizontal air cylinder 319 is pivoted at 321 on plate 285 for oscillation on a vertical axis. Cylinder 319 has a piston rod 323 having a pin connection at 325 with one end of the shear bed plate 287. The arrangement is such that when the piston rod 323 is extended from the cylinder 319, the shear plates and shear blades are angled relative to the strip S as shown in solid lines in FIG. 21. When the piston rod 323 is retracted into the cylinder 319, the shear plates and shear blades are oppositely angled relative to the strip as shown in dotted lines in FIG. 21. The operation of cylinder 309 is controlled in the same manner as previously described for cylinder 93. A suitable control is provided for cylinder 319 so that during the intervals between successive operations of cylinder 309, the shear plates and shear blades are shifted from one of their angled positions to the other. In consequence, the successive cuts of the strip S, such as indicated at C–1 and C–2 in FIG. 23, are oblique with respect to the length of the strip segments and oppositely angled.

Figure 24:
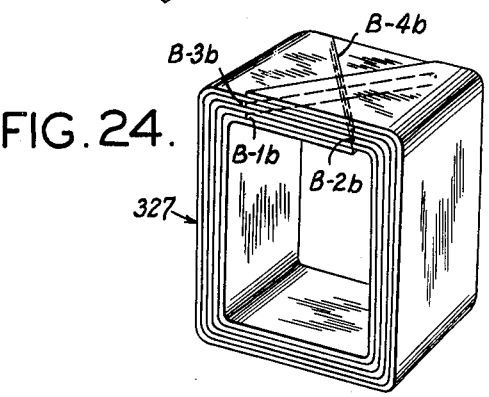
FIG. 24 is a perspective of a loop made with the mechanism shown in FIGS. 21 and 22.

FIG. 24 shows a core loop 327 wound from strip segments cut in this manner, this loop being similar to that shown in FIG. 19 except that the successive butt joints, instead of being coplanar in a plane at right angles to the yoke, are oblique and oppositely angled. In FIG. 24 the successive butt joints are indicated at B–1b, B–2b, B–3b and B–4b. It will be observed that joints B–1b and B–3b are coplanar in a plane oblique to the side faces of the loop, joints B–2b and B–4b are coplanar in an oppositely angled oblique plane intersecting the plane of joints B–1b and B–3b. From this it will be understood that in a loop with many strip segments, the first and subsequent odd-numbered butt joints are coplanar in a plane oblique to the side faces of the loop, and the second and subsequent even-numbered butt joints are coplanar in an oppositely angled oblique plane intersecting the plane of the odd-numbered butt joints.

FIGS. 25–28 illustrate a modification of the machine for winding butt-joint core loops similar to the loops 263 and 327 except that the butt joints are serrated, with the serrations of successive butt joints laterally offset. For this purpose, the shear is modified to have serrated shear blades which are movable transversely with respect to the strip between two end positions to attain the lateral offset of successive joints. As shown, in this case the shear comprises a block 329 (corresponding to block 78) fixed on the base plate 77, this block 329 being formed with a dovetail slideway 331 extending transversely with respect to the strip S. A horizontal shear bed plate 333 has a dovetail 335 slidable in the slideway. Fixed on the shear bed plate 333 is a lower horizontal serrated shear blade 337. Extending up from opposite ends of plate 333 are vertical posts 339. At 341 is indicated a horizontal shear head plate. Mounted on the bottom of the head plate 341 is an upper horizontal serrated shear blade 343 cooperable with the lower shear blade 337 to make a serrated cut across the strip S. The head plate 341 has vertical cylindrical guides 345 slidable on the posts 339.

Spanning the posts at their upper ends is a cap plate 347. Mounted on this cap plate is a vertical cylinder 349 (corresponding to cylinders 93 and 309) having a piston rod 351 extending down through an opening 353 in the cap plate and connected to the shear head plate 341. The piston rod is normally retracted to hold the upper shear blade in a raised retracted position for passage of the strip S. The cylinder is operable to drive the upper shear blade down to shear the strip, and then to return the upper shear blade to its raised retracted position. The plates 333, 341 and 347 and the cylinder 349 are slidable as a unit transversely with respect to the strip S between end positions determined by the engagement of set screws 355 and 357 threaded in downwardly extending lugs 359 and 361 on plate 333 with opposite ends of block 329 (see FIG. 27). The connections 363 and 365 to the cylinder 349 are flexible hose lines to permit this.

A horizontal air cylinder 367 is mounted on the plate 77 in line with plate 333 and has a piston rod 369 connected to the plate 333 at 371. The arrangement is such that when the piston rod 369 is extended from the cylinder 367, the shear plates and shear blades occupy the inner position illustrated in FIG. 27 determined by engagement of screw 355 with the outer end of the block 329. When the piston rod 369 is retracted into the cylinder 367, the shear plates and shear blades occupy an outer position determined by the engagement of set screw 357 with the inner end of the block 329. The set screws 355 and 357 are adjusted so that the stroke of the shear plates and shear blades is one-half the spacing of the teeth of the serrated shear blades. The operation of the cylinder 349 is the same as that of cylinders 93 and 309. A suitable control is provided for cylinder 367 so that during the intervals between successive operations of cylinder 349, the shear plates and shear blades are shifted from one of their end positions to the other. In consequence, the successive serrated cuts of the strip S, such as indicated at C–1a and C–2a in FIG. 29 are laterally staggered one-half the spacing of the teeth of the cuts.

FIG. 30 shows a core loop 373 wound from strip segments cut according to FIG. 29, this loop being similar to the loops shown in FIGS. 19 and 24 except that the butt joints are serrated butt joints, with successive joints laterally offset one-half the pitch of the teeth of the joints. In FIG. 30, two successive butt joints are indicated at B–1c and B–2c. It will be understood that in a loop with many strip segments, the first and subsequent odd-numbered serrated butt joints are aligned, and the second and subsequent even-numbered serrated butt joints are aligned and laterally offset from the odd-numbered joints. In the core loops illustrated in FIGS. 24 and 30, the butt joints (oblique in the one case, serrated in the other) are superimposed. This comes about by reason of using the advancing mechanism for switch 211. It will be understood that the use of this advancing mechanism may be omitted, in which case the butt joints will be distributed around the loop.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:
1. In a machine for making magnetic core loops from a continuous strip of magnetic material having a rotatable core form: means for continuously feeding the strip toward the form, means for cutting the strip into individual segments, means for actuating said feeding means to advance the cut end of the strip into lapping relation with respect to the trailing end of each segment cut from the strip, and means for continuously supplying to the form for winding thereon a succession of said segments with the leading end of each segment lapping the trailing end of the previous segment thereby to make a flux transmitting joint between the trailing end of each segment and the leading end of the succeeding segment.

2. In a machine for making magnetic core loops from a continuous strip of magnetic material having a rotatable core form: means for continuously feeding the strip toward the form, means for cutting the strip into individual segments with each segment longer than the preceding segment, means for actuating the feeding means to advance the cut end of the strip into lapping relation with respect to the trailing end of each segment cut from the strip, and means for continuously supplying to the form for winding thereon a succession of said segments with the leading end of each segment lapping the trailing end of the previous segment thereby to make a flux transmitting joint between the trailing end of each segment and the leading end of the succeeding segment.

3. In a machine for making magnetic core loops from a continuous strip of magnetic material having a rotatable core form and means for rotating said form: a set of feed rolls adapted continuously to feed said strip toward said form, a shear for intermittently cutting the strip into individual segments as it is fed toward said form, and means for intermittently increasing the speed of said feed rolls following each cutting operation to advance the cut end of said strip to lap the trailing end of each previously cut segment as the segments are fed toward said form thereby to make a flux transmitting joint between the trailing end of each segment and the leading end of the succeeding segment.

4. In a machine for making magnetic core loops from a continuous strip of magnetic material having a rotatable core form and means for rotating said form: a set of feed rolls adapted continuously to feed said strip toward said form, a shear for intermittently cutting the strip into individual segments as it is fed toward said form, means responsive to the rotation of the form through a predetermined angle to actuate said shear, and means for intermittently increasing the speed of said feed rolls following each cutting operation to advance the cut end of said strip to lap the trailing end of each previously cut segment as the segments are fed toward said form thereby to make a flux transmitting joint between the trailing end of each segment and the leading end of the succeeding segment.

5. In a machine for making magnetic core loops from a continuous strip of magnetic material having a rotatable core form, means for rotating said form and means for effecting wrapping of a succession of individual segments of the strip material around the form for winding of said segments one after another on the form: a set of feed rolls adapted continuously to feed said strip toward said form, a shear for intermittently cutting the strip into individual segments as it is fed toward said form, means responsive to the rotation of the form through a predetermined angle to actuate the shear, and means for intermittently increasing the speed of said feed rolls following each cutting operation to advance the cut end of said strip to lap the trailing end of each previously cut segment as the segments are fed toward said form thereby to make a flux transmitting joint between the trailing end of each segment and the leading end of the succeeding segment.

6. In a machine as set forth in claim 5, said speed-increasing means being driven by the shear and acting upon the opening of the shear.

7. In a machine as set forth in claim 5, means for delaying the operation of the shear until slightly after the form has completed a cycle of rotation through said angle.

8. In a machine as set forth in claim 7, said means for actuating the shear comprising a switch and means driven in timed relation to the core form for intermittently operating the switch, and said delaying means comprising means for moving the switch following each operation thereof to delay its next operation.

9. In a machine for making magnetic core loops having a rotatable core form and means for driving the form: means for forming a succession of individual segments of magnetic strip material and for effecting wrapping of said segments around the form one after the other with a flux-transmitting joint between the trailing end of each segment and the leading end of the succeeding segment comprising strip feed means for feeding a continuous strip of magnetic material toward the form, means for continuously driving the strip feed means in strip-feeding direction continuously to feed the strip toward the form at a speed corresponding substantially to the speed at which the segments are wound on the form, a cutter for cutting the strip, means operable in response to rotation of the form through a predetermined angle for operating the cutter to cut the strip into individual segments, and means for delaying the operation of the cutter until slightly after the form has completed a cycle of rotation through said angle, said segments issuing from the cutter with the trailing end of each segment contiguous to the leading end of the succeeding segment thereby to provide a flux-transmitting joint therebetween and the succession of segments issuing from the cutter being fed continuously to the form for wrapping thereon with said flux-transmitting joints maintained in the wrapped succession of segments.

10. A machine for making magnetic core loops from a continuous strip of magnetic material comprising a rotatable core form, a pair of feed rolls for feeding the strip toward the form, a shear, means for operating the shear in response to rotation of the form through a predetermined angle for cutting the strip into segments, means for delaying operation of the shear until slightly after the form has completed a cycle of rotation through said angle, and an endless belt engageable with the form and interconnected with said feed rolls for continuously driving said feed rolls continuously to feed the strip at a speed corresponding to the peripheral speed of the form, a portion of said belt extending from a point adjacent the shear to said form and acting to feed segments issuing from the shear to the form.

11. In a machine for making magnetic core loops having a rotatable core form and means for driving the form: means for forming a succession of individual segments of magnetic strip material and for effecting wrapping of said segments around the form one after the other with a flux-transmitting joint between the trailing end of each segment and the leading end of the succeeding segment comprising strip feed means for feeding a continuous strip of magnetic material toward the form, means for continuously driving the strip feed means in strip-feeding direction continuously to feed the strip toward the form at a speed corresponding substantially to the speed at which the segments are wound on the form, a cutter for cutting the strip, means operable in response to rotation of the form through a predetermined angle for operating the cutter to cut the strip into individual segments, and means for intermittently increasing the speed of said feed means following each cutting operation to advance the cut end of the strip to lap the trailing end of each previously cut segment, said segments issuing from the cutter with the trailing end of each segment contiguous to the leading end of the succeeding segment thereby to provide a flux-transmitting joint therebetween and the succession of segments issuing from the cutter being fed continuously to the form for wrapping thereon with said flux-transmitting joints maintained in the wrapped succession of segments.

12. A machine for making magnetic core loops from a continuous strip of magnetic material comprising a rotatable core form, a pair of feed rolls for feeding the strip toward the form, a shear, and means for operating the shear in response to rotation of the form through a predetermined angle for cutting the strip into segments, means for intermittently increasing the speed of the feed rolls following each operation of the shear to advance the cut end of the strip to lap the trailing end of each previously cut segment, and an endless belt engageable with the form and interconnected with said feed rolls for continuously driving said feed rolls continuously to feed the strip at a speed corresponding to the peripheral speed of the form, a portion of said belt extending from a point adjacent the shear to said form and acting to feed segments issuing from the shear to the form.

13. A machine as set forth in claim 12 wherein said speed-increasing means is driven by the shear and acts upon the opening of the shear.

14. In a machine for making magnetic core loops having a rotatable core form and means for driving the form: means for forming a succession of individual segments of magnetic strip material and for effecting wrapping of said segments around the form one after the other with a flux-transmitting joint between the trailing end of each segment and the leading end of the succeeding segment comprising strip feed means for feeding a continuous strip of magnetic material toward the form, means for continuously driving the strip feed means in strip-feeding direction continuously to feed the strip toward the form at a speed corresponding substantially to the speed at which the segments are wound on the form, a cutter operable to cut the strip into individual segments, and means rotatable in timed relation to the core form for timing the operation of the cutter to occur once each revolution of said rotatable means, whereby each successive segment is cut to greater length than the preceding segment, said segments issuing from the cutter with the trailing end of each segment contiguous to the leading end of the succeeding segment thereby to provide a flux-transmitting joint therebetween, and the succession of segments issuing from the cutter being fed continuously to the form for wrapping thereon with said flux-transmitting joints maintained in the wrapped succession of segments.

15. In a machine as set forth in claim 14, means operable once each revolution of said rotatable means for varying the timing of operation of the cutter.

16. A machine for making magnetic core loops from a continuous strip of magnetic material comprising a rotatable core form, a pair of feed rolls for feeding the strip toward the form, a shear operable to cut the strip into individual segments, means rotatable in timed relation to the core form for timing the operation of the shear once each revolution of said rotatable means whereby each successive segment is cut to a greater length than the preceding segment, said segments issuing from the shear with the trailing end of each segment contiguous to the leading end of the succeeding segment thereby to provide a flux-transmitting joint therebetween, and an endless belt engageable with the form and interconnected with said feed rolls for continuously driving said feed rolls continuously to feed the strip at a speed corresponding to the peripheral speed of the form, a portion of said belt extending from a point adjacent the shear to said form and acting to feed segments issuing from the shear to the form.

17. A machine as set forth in claim 16 in which said core form is of rectangular shape.

References Cited in the file of this patent
UNITED STATES PATENTS

| | | |
|---|---|---|
| 1,303,821 | McClenathen | May 13, 1919 |
| 1,475,801 | Cuccia | Nov. 27, 1923 |
| 2,030,989 | Hofstetter et al. | Feb. 18, 1936 |
| 2,108,664 | Franz | Feb. 15, 1938 |
| 2,220,256 | Martindell | Nov. 5, 1940 |
| 2,237,759 | Kwitek | Apr. 8, 1941 |
| 2,261,972 | Matthews | Nov. 11, 1941 |
| 3,008,222 | Steinmayer | Nov. 14, 1961 |